United States Patent [19]
Kitajima et al.

[11] Patent Number: 5,297,582
[45] Date of Patent: Mar. 29, 1994

[54] METHOD FOR WATER LEAKAGE PREVENTION IN PIPELINE

[75] Inventors: Hisashi Kitajima; Hidehiro Noda, both of Tokyo, Japan

[73] Assignees: Kabushiki Kaisha Iseki Kaihatsu Koki; Toa Grout Kogyo Kabushiki Kaisha, both of Tokyo, Japan

[21] Appl. No.: 33,983

[22] Filed: Mar. 19, 1993

Related U.S. Application Data

[62] Division of Ser. No. 737,379, Jul. 7, 1991, abandoned.

[30] Foreign Application Priority Data

Nov. 22, 1990 [JP] Japan .................. 2-315908

[51] Int. Cl.$^5$ .............. F16L 55/165; F16L 55/18
[52] U.S. Cl. ........................ 138/98; 138/97; 254/134.4; 254/134.5; 405/154; 405/184
[58] Field of Search .............. 138/97, 98; 254/134.4, 254/134.5; 405/154, 184; 264/36, 269; 29/402.09

[56] References Cited

U.S. PATENT DOCUMENTS

| | | | |
|---|---|---|---|
| 578,433 | 3/1897 | Wehl | 138/98 |
| 697,315 | 4/1902 | Bergdoll | 254/134.5 |
| 735,078 | 8/1903 | Felsing | 138/98 |
| 768,477 | 8/1904 | McKinley | 138/98 |
| 1,036,114 | 8/1912 | Hodgman | 254/134.4 |
| 2,980,399 | 4/1961 | Littlefield | 254/134.4 |
| 3,554,493 | 1/1971 | Bowden et al. | 254/134.3 |
| 5,042,532 | 8/1991 | Gilleland | 138/98 |
| 5,096,332 | 3/1992 | Kawafuji | 405/154 |

FOREIGN PATENT DOCUMENTS

| | | | |
|---|---|---|---|
| 0141420 | 11/1979 | Japan | 138/98 |
| 01-92524 | 8/1989 | Japan | 138/97 |
| 2-103124 | 4/1990 | Japan | 138/97 |
| 8810394 | 12/1988 | PCT Int'l Appl. | |
| 1263929 | 8/1974 | United Kingdom | 138/97 |
| 2041147 | 9/1980 | United Kingdom | F16L 55/18 |
| 2129627 | 5/1984 | United Kingdom | H026/9/06 |

*Primary Examiner*—Harvey C. Hornsby
*Assistant Examiner*—Randall E. Chin
*Attorney, Agent, or Firm*—Stoel Rives Boley Jones & Grey

[57] ABSTRACT

A method for water leakage prevention in a portion connecting a first pipeline to a second pipeline having one end thereof in communication with a portion of the first pipeline is provided. This method includes the steps of passing elastically deformable drawing means from the other end of the second pipeline to one end of the first pipeline; engaging an impermeable cut-off member, having an expandable hose portion and a flange portion provided integrally with one end of the hose portion, with the drawing means at one end of the first pipeline at the hose portion; drawing the cut-off member into the first and second pipelines by drawing back the hose portion of the drawing means toward the other end of the second pipeline; and disposing the cut-off member in the first and second pipelines, so that the flange portion is positioned within the first pipeline and the hose portion extends within the second pipeline.

4 Claims, 11 Drawing Sheets

METHOD FOR WATER LEAKAGE PREVENTION IN PIPELINE

This is a division of application Ser. No. 07/737,379, filed Jul. 1, 1991 and now abandoned.

BACKGROUND OF THE INVENTION

1. Field of the Invention

This invention relates to a method for water leakage prevention in a portion connecting a first pipeline to a second pipeline which branches off from the first pipeline.

2. Description of the Prior Art

A portion connecting a first pipeline, such as a main sewer pipe, to a second pipeline, such as a branch pipe, is generally bonded in a liquid tight manner to each pipeline by means of a bonding agent such as mortar. In general, the bonding agent may be removed from the first or second pipelines by only slightly relatively displacing the pipelines. As a result, a space is formed in the connection portion, and the liquid tightness of the connection portion is lowered. A cut-off treatment is performed to prevent water leakage from the space formed in the connection portion.

This water cut-off treatment is generally performed by a chemical feeding method involving the injection of a cut-off agent of cement or liquid type into the space and around the connection portion and then coagulating the cut-off agent.

The chemical feeding method exhibits the following problems. When water leakage occurs in practice, the cut-off agent is diluted with water, flows into the pipeline, and frequently fails to harden. Consequently, subsequent treatment for removing cut-off agent from the pipeline should also be conducted. In the chemical feeding method using a cement-type cut-off agent, the hardened cut-off agent does not exhibit elasticity. When pipes are displaced due to vibration, land subsidence or the like, the hardened cut-off agent is peeled off from the pipeline, and cracks form therein. As a result, any long-term, stable water cut-off is not expected. In the chemical feeding method using a liquid-type cut-off agent, the mechanical strength of the cut-off agent is low. The water cut-off is therefore not stably maintained for a long period of time.

In order to solve these problems, the present inventors employ cut-off methods utilizing an impermeable cut-off member. This impermeable cut-off member has an expandable hose portion and a flange portion provided integrally with one end of the hose portion, so that the flange portion is in liquid tight contact with the inner surface of the first pipeline. The hose portion of the impermeable cut-off member is in contact with the inner surface of the second pipeline and extends within the second pipeline.

This cut-off member exhibits the advantage of water leakage prevention without using a cut-off agent to close the space formed in the connection portion. Water leakage from a portion of the second pipeline is also prevented.

When the first and second pipelines are of a size such that an operator is unable to enter, it is difficult to dispose the impermeable cut-off member, so that the flange portion is positioned within the first pipeline and the hose portion extends within the second pipeline.

SUMMARY OF THE INVENTION

An object of the present invention is to provide a cut-off method to dispose an impermeable cut-off member, which has an expandable hose portion and a flange portion provided integrally with one end of the hose portion, in a predetermined configuration, even when the pipeline is of a size such that an operator is unable to enter.

A cut-off method of water leakage prevention in a portion connecting a first pipeline to a second pipeline having one end in communication with a portion of the first pipeline according to the present invention includes the steps of: passing elastically deformable drawing means from the other end of the second pipeline to the one end of the first pipeline, engaging an impermeable cut-off member at the expandable hose portion with the drawing means; drawing the cut-off member into the first and second pipelines by drawing back the drawing means toward the other end of the second pipeline in the engaged condition; and disposing the cut-off member in the first and second pipelines, so that the flange portion is positioned within the first pipeline and the hose portion extends within the second pipeline.

According to the present invention, the drawing means, made of ropes, wires, steel wires, band steel wires or the like, is passed from the other end of the second pipeline to the one end of the first pipeline through the first and second pipelines. The hose portion of the cut-off member is then engaged with the drawing means at one end of the first pipeline. In the engaged condition, the drawing means is drawn back toward the other end of the second pipeline. As the cut-off member is drawn into the first and second pipelines in this way, the cut-off member is ultimately disposed in the first and second pipelines, so that the flange portion is positioned within the first pipeline and the hose portion extends within the second pipeline.

According to the present invention, the cut-off member is drawn into the first and second pipelines by drawing the drawing means extending within the first and second pipelines back toward the other end of the second pipeline. Therefore, the impermeable cut-off member having the expandable hose portion and the flange portion provided integrally with one end of the hose portion is disposed in a predetermined configuration, even though the pipeline is of a size such that an operator is unable to enter.

Elastically deformable first and second elongate members may be used as the drawing means. In this case, the first and second elongate members are respectively inserted into the connection portion from one end of the first pipeline and the other end of the second pipeline, and engaged with each other.

The top end of the second elongate member is moved toward one end of the first pipeline by drawing back the first elongate member toward one end of the first pipeline when the elongate members are engaged. The cut-off member is then engaged with the top end of the second elongate member.

The hose portion of the cut-off member is engaged with the drawing means at one end of the first pipeline by engaging the hose portion with the first elongate member that is, in turn, engaged with the second elongate member. In this case, the cut-off member is disposed in the first and second pipelines by drawing back the second elongate member toward the other end of the second pipeline.

The drawing means is passed from the other end of the second pipeline to the one end of the first pipeline by inserting the drawing means into the connection portion from the other end of the second pipeline, engaging the top end of the drawing means with a carrier disposed movably within the first pipeline, and moving the carrier toward one end of the first pipeline in an engaged condition.

The drawing means may be inserted into one end of the first pipeline from the other end of the second pipeline by inserting the top end of the drawing means into the first pipeline from the other end of the second pipeline, and by moving the top end of the drawing means toward one end of the first pipeline by means of high-pressure fluid jetted from a nozzle disposed movably within the first pipeline.

Furthermore, it is preferable to include the step of maintaining the cut-off member so that the flange portion of the cut-off member is in liquid tight contact with the inner surface of the first pipeline, and the hose portion extends within the second pipeline.

BRIEF DESCRIPTION OF THE DRAWINGS

The foregoing and other objects and features of the invention will become apparent from the following description of preferred embodiments of the invention with reference to the accompanying drawings, in which.

DESCRIPTION OF THE PREFERRED EMBODIMENTS

Figure 1:
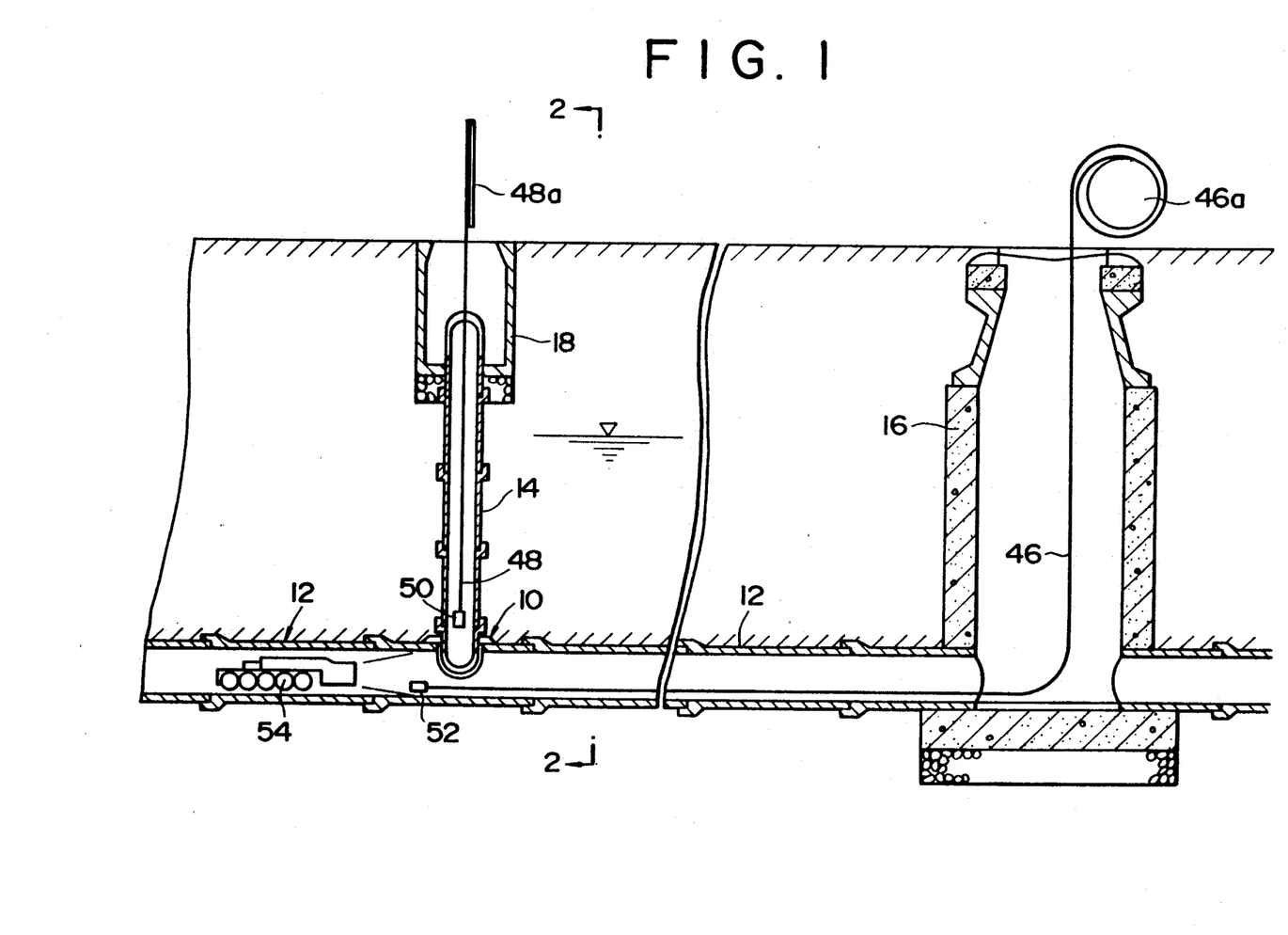
FIG. 1 is a cross-sectional view of a pipeline to be subjected to the cut-off methods of the present invention.
Figure 2:
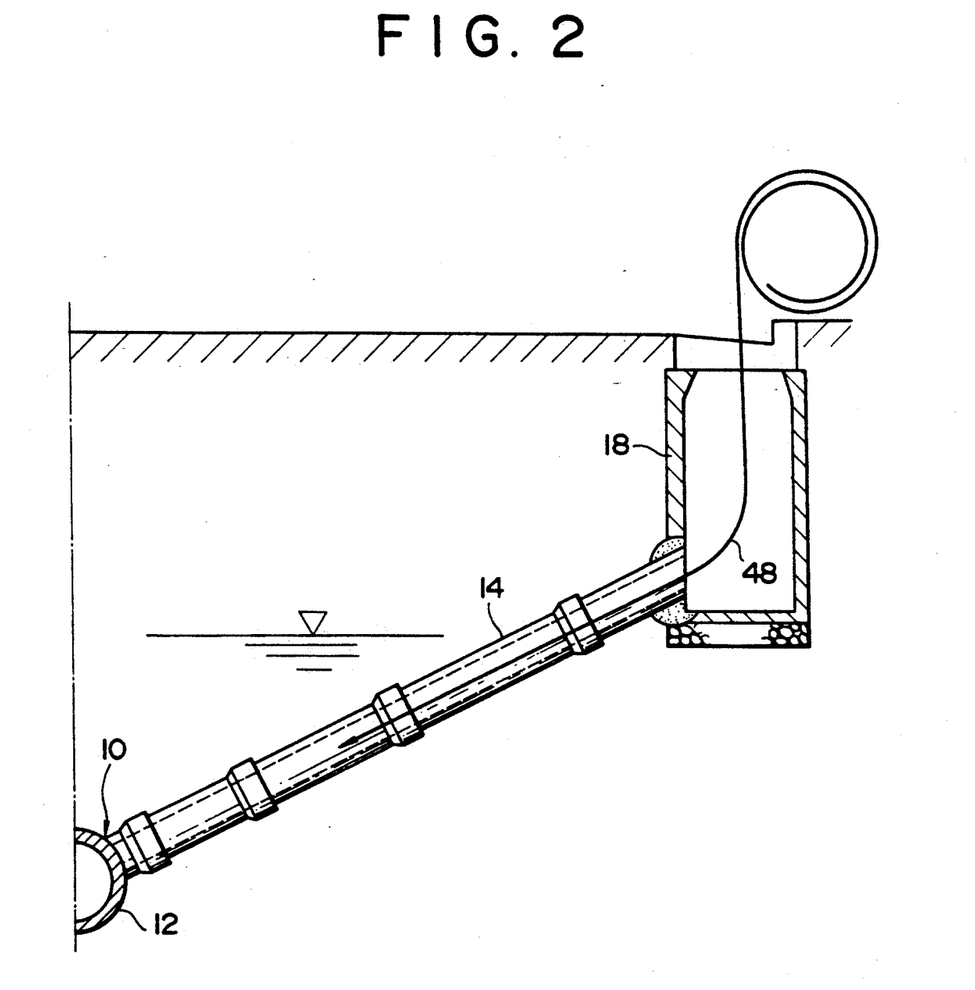
FIG. 2 is a cross-sectional view taken along line 2—2 in FIG. 1.
Figure 3:
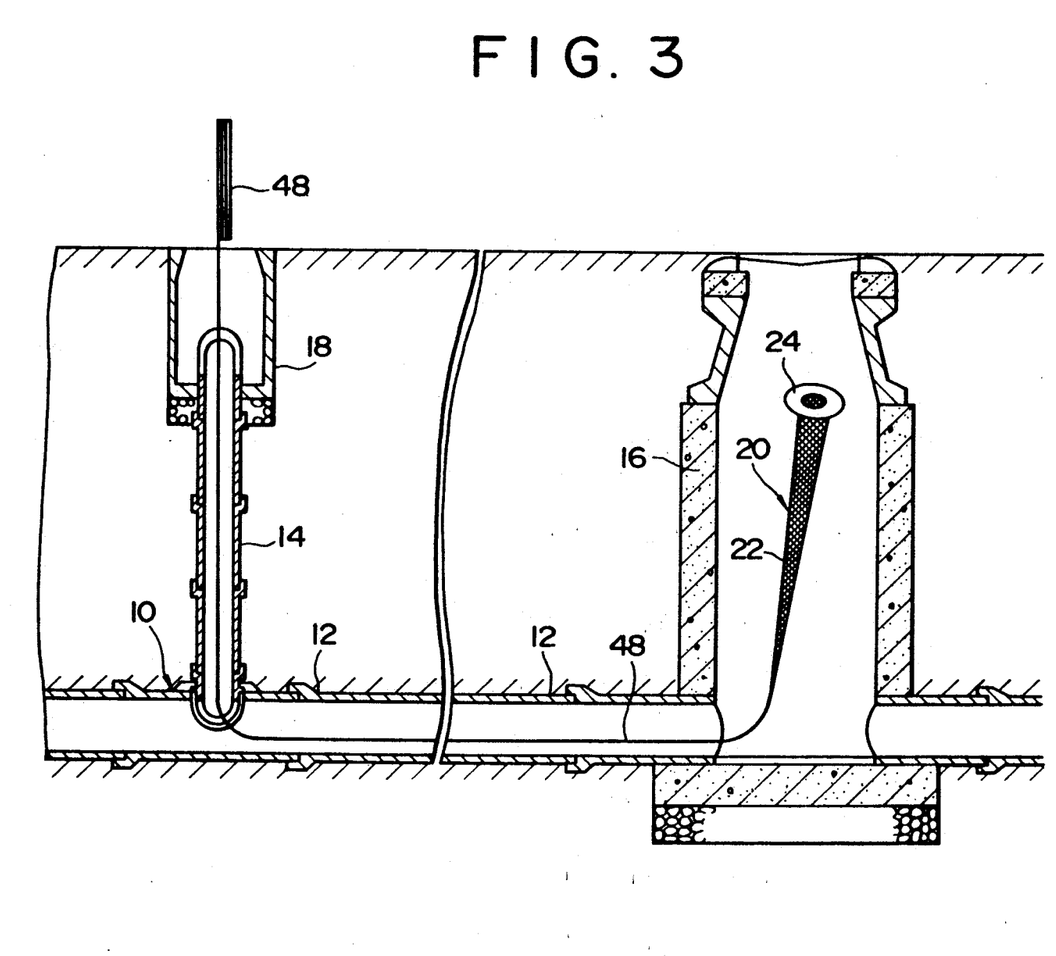
FIG. 3 is a cross-sectional view showing a cut-off member disposed within the pipeline.

Referring to FIGS. 1 through 3, a portion 10 to be subjected to cut-off treatment is a portion connecting a first pipeline 12 buried under the ground to a second pipeline 14, branching off from a portion of the first pipeline and extending toward the ground surface.

In an illustrated embodiment, the first pipeline 12 is a main pipe for sewerage composed of a plurality of pipes connected in series. One end of the first pipeline 12 communicates with a manhole 16 and the other end is connected to the other manhole (not shown). The first pipeline 12 may be a pipe composed of a main pipe already installed and a coating pipe formed at the inside of the main pipe, that is, a repairing pipe portion.

The second pipeline 14 is a branch pipe for sewerage composed of a plurality of pipes connected in series. One end of the second pipeline 14 communicates with the first pipeline 12, and the other end communicates with a manhole 18, such as a gully or storm-water inlet.

Figure 4:
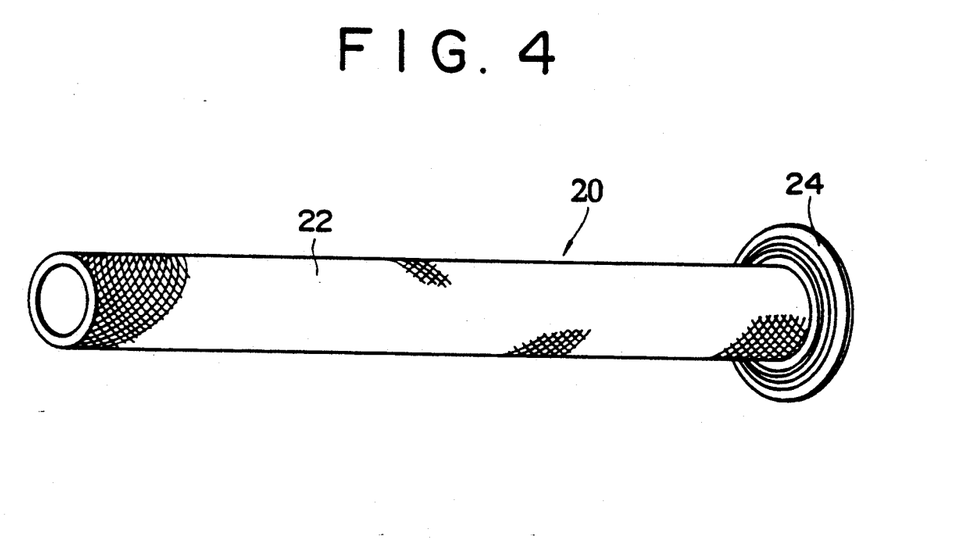
FIG. 4 is a perspective view showing a cut-off member of a preferred embodiment according to the present invention.
Figure 5:
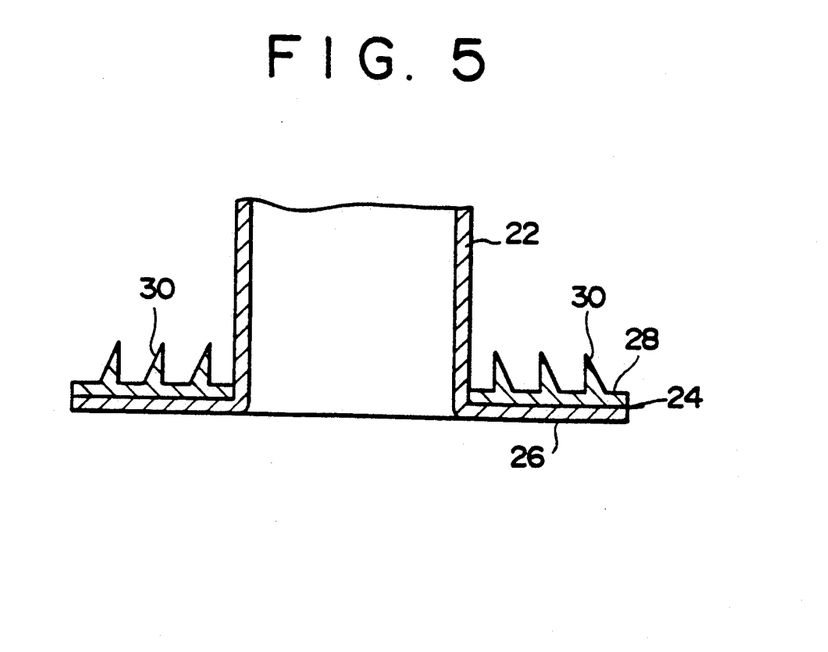
FIG. 5 is a enlarged cross-sectional view showing the side of a flange portion of the cut-off member of FIG. 4.

As shown in FIGS. 4 and 5, a cut-off member 20 used in the present invention has an expandable hose portion 22 and an elastically deformable flange portion 24 integral with one end of the hose portion.

The hose portion 22 has an outer diameter approximately equal to the inner diameter of the second pipeline 14 in which the hose portion is disposed as well as a length longer than the length of the second pipeline 14. The hose portion 22 may be made by impregnating an expandable base material, which is formed of fabrics, knittings, sponge-like raw material or the like, into a hose shape, with a resin characterized by hardening upon exposure to heat, light or the like, in particular, upon exposure to ultraviolet light.

The flange portion 24 has an outer diameter larger than the outer diameter of the second pipeline 14 as well as a thickness slightly larger than the thickness of the hose portion 22. As shown in FIG. 5, the flange portion 24 is provided with a main portion 26, formed by expanding the end of the hose portion 22 in the radial direction, and an auxiliary member 28 mounted on the main portion at the side of the hose portion.

The auxiliary member 28 is made of an elastically deformable material such as rubber, and has a plurality of projections 30 on its surface at the side of the hose portion 22 and continuously extending around the axis of the hose portion 22.

The hose portion 22 may be of equal or larger thickness than the flange portion 24. Preferably, however, the thickness of the hose portion 22 is smaller than the thickness of the flange portion 24.

The thickness of the hose portion 22, the thickness of the flange portion 24 and the height of the projection 30 may be defined as 0.2 to 5 mm, 1 to 6 mm and 4 to 8 mm respectively, for instance.

Figure 6:
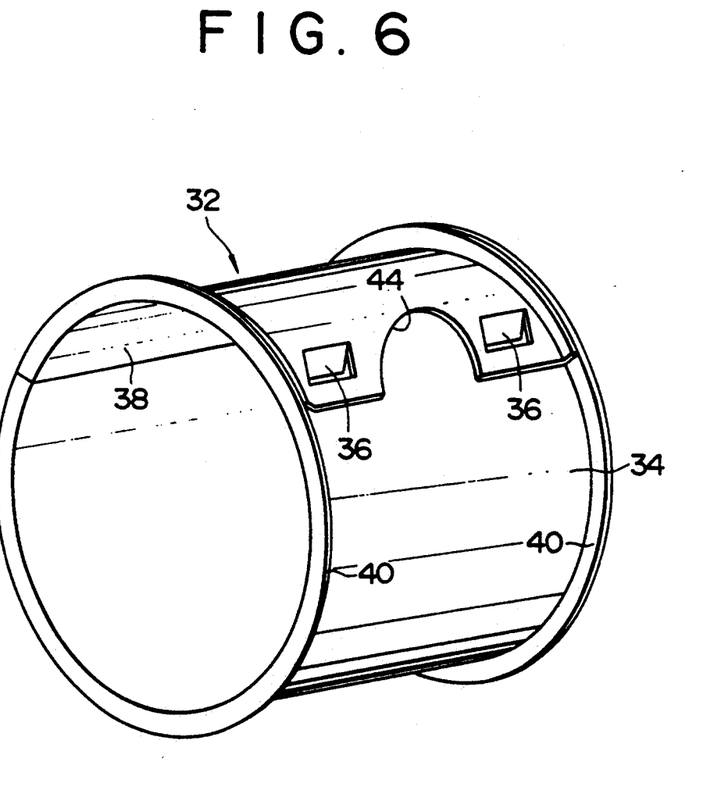
FIG. 6 is a perspective view showing a base used with the cut-off member of FIG. 4 as a preferred embodiment according to the present invention.
Figure 7:
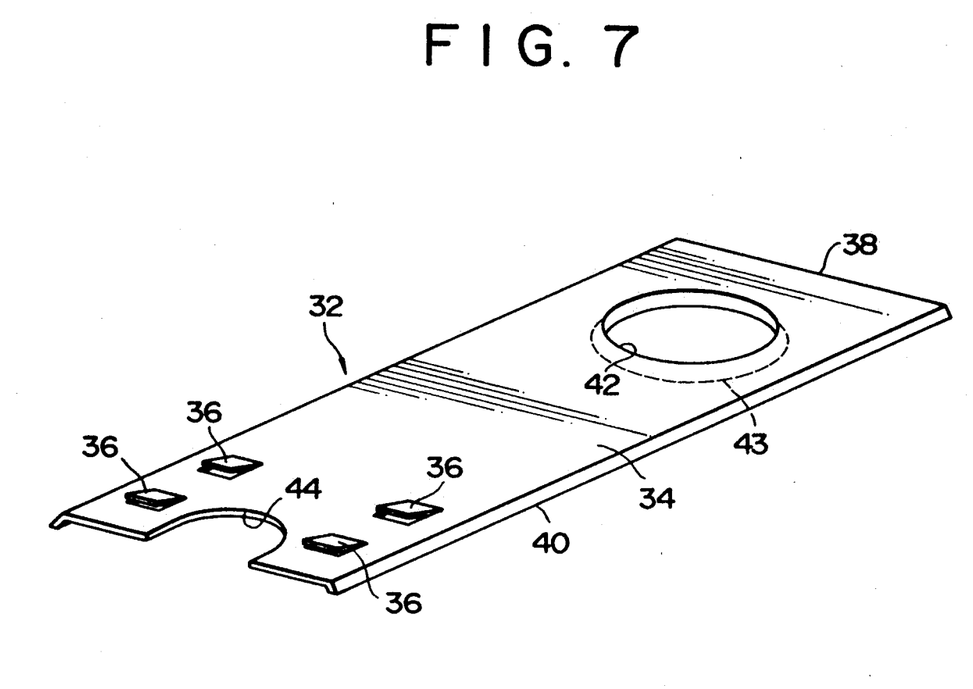
FIG. 7 is a perspective view showing the base of FIG. 6 in its expanded condition.

Furthermore, a sheet-like base 32, shown in FIGS. 6 and 7, is used to maintain the flange portion 24 of the cut-off member 20 in liquid tight contact with the inner surface of the first pipeline 12. The base 32 is made of a metal material, such as stainless steel, copper, or copper alloy with corrosion resistance, or a synthetic material such as polyvinyl chloride.

The base 32 has an elastically deformable sheet portion 34; a plurality of female engaging portions 36 formed at one end of the sheet portion; a male engaging portion 38 formed at the other end of the sheet portion 34 capable of engaging with the female engaging portions 36; and a bent portion 40 continuously extending over the longitudinal length of the sheet portion 34 at both rim portions in the width direction of the sheet portion 34.

In the sheet portion 34, a circular hole 42 is formed at the side of the male engaging portion 38. A semicircular notch 44 is formed at the side of the female engaging portion 36. Both the hole 42 and the notch 44 have a radius of curvature approximately equal to one half of the inner diameter of the second pipeline 14. A portion 43 defining the hole 42 is bent in the same direction as the bent portion 40.

In the illustrated embodiment, the female engaging portion 36 has a tongue that is formed by striking a portion of the sheet portion 34 toward the side opposite the bent portion 40. The male engaging portion 38 constitutes the other end of the sheet portion 34. However, the engaging portions mounted on the sheet portion 34 may be replaced with any other engaging portions such as Z-shaped metal fittings or the like.

As shown in FIG. 6, the base 32 is preliminarily wound in a spiral form having a diameter smaller than the inner diameter of the first pipeline 12, that is, in a cylindrical form. In the cylindrically wound conditions the bent portion 40 is directed in the radial outward direction.

The base 32 has an inner diameter approximately equal to the inner diameter of the first pipeline 12 when the male and female engaging portions 36 and 38 are engaged. The axial length of the base 33, is slightly larger than the diameter of the flange portion 24 of the cut-off member 20. The thickness of the base 32 may be defined as 0.5 to 3 mm.

At the time of cut-off treatment, the interiors of the first pipeline 12 and the second pipeline 14 are cleaned.

As shown in FIG. 1, first and second elongate members 46 and 48, acting as means for drawing the cut-off member into the first and second pipelines 12 and 14, are then respectively inserted into the first and second pipelines 12 and 14 from the manholes 16 and 18.

The first and second elongate members 46 and 48 are made of a band-like or rope-like elastically deformable material, such as band steel wire or wire rope, and are wound on reels 46a and 48b installed on the ground, respectively.

Subsequently, the top ends of the first and second elongate members 46 and 48 are mutually engaged within the first pipeline 12.

It is preferable that a permanent magnet 50 is, for example, mounted on one of the first and second elongate members 46 and 48 to magnetically engage the first and second elongate members with each other by the attractive force of the permanent magnet. When using the permanent magnet 50, the other top ends of the first and second elongate members 46 and 48 are made of a magnetic material.

In this manner, the permanent magnet 50 and the other side of the first and second elongate members 46 and 48 are mutually attracted, and, therefore, the first and second elongate members 46 and 48 are easily engaged with each other.

However, as shown in FIG. 1, a plurality of hook-like engaging portions 52 are formed at one of the, first and second elongate members 46 and 48, so that the other of the first and second elongate members may be engaged with the hook-like engaging portions.

By using the second elongate member 48 having a top end provided with a chain-like member, the second elongate member 48 may be easily passed through the second pipeline 14. In this case, the chain-like member may be replaced with the engaged portion to be engaged with the hook-like engaging portions.

The first elongate member 46 is then drawn toward the manhole 16 when the elongate members 46 and 48 are mutually engaged. In this way, the top end of the second elongate member 48 is drawn into the manhole 16. However, the rear end of the second elongate member 48 remains at the outside of the manhole 18.

If the second elongate member 48 is drawn toward the manhole 16 in this way, the second elongate member 48 may be disposed between the manhole 16 and the other manhole 18 with more security, in comparison with the case the elongate member 48 is pushed toward the manhole 16 from the other manhole 18.

After the engagement between the elongate members is released, the top end of the hose portion 22 of the cut-off member 20 is connected to that of the second elongate member 48 as shown in FIG. 3, and the second elongate member 48 is drawn back toward the other manhole 18.

The second elongate member 48 is drawn back until the flange portion 24 of the cut-off member 20 is brought into contact with the inner surface of the first pipeline 12. In this way, the cut-off member 20 is disposed, so that the flange portion 24 is within the first pipeline 12 and the hose portion 22 extends through the second pipeline 14.

Before the cut-off member 20 is connected with the second elongate member 48, hardening means such as a heat source and/or a light source for hardening the cut-off member 20; electric wires for supplying electric power to the hardening means; and a rope for moving the hardening means within the cut-off member are disposed within the cut-off member 20.

Therefore, the hardening means, the electric wires and the rope are moved within the second pipeline 14 together with the cut-off member 20 by drawing back the second elongate member 48.

Preferably, the hardening means is disposed in the neighborhood of the flange portion 24 of the cut-off member 20, and the electric wires and the rope are disposed so that they may extend through the hose portion 22 to partially protrude from the top end of the hose portion 22.

For instance, the cut-off member 20 may be disposed as mentioned above by moving both of the elongate members 46 and 48 to the side of the manhole 18 when the elongate members 46 and 48 are mutually engaged within the first pipeline 12, and the top end of the hose portion 22 of the cut-off member 20 is connected to the rear end of the first elongate member 46.

During each of the preceding operations, it is preferable that a television camera 54, shown in FIG. 1, is disposed within the first pipeline 12 so that those operations may be confirmed.

Figure 8:
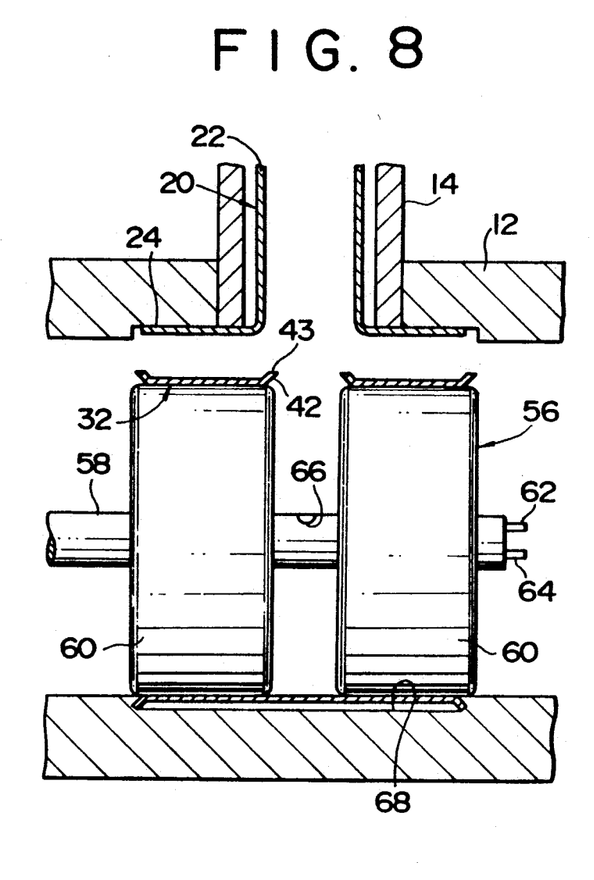
FIG. 8 is a cross-sectional view showing the condition of the base transferred into the pipeline together with an expanding machine.

As shown in FIG. 8, the base 32 is then disposed at the connection portion within the first pipeline 12 together with an expanding machine 56 to expand the base 32 in the radial direction.

The expanding machine 56 is provided with a shaft portion 58; a pair of expansion portions 60 fixed to the shaft portion, so as to extend continuously around the shaft portion and expand like a floating ring by the action of a pressure fluid such as compressed air; and a pair of nipples 62 and 64 to receive the pressure fluid from a hose (not shown).

The nipple 62 communicates with both of the expansion portions 60 through a flow path (not shown), and the nipple 64 communicates with an opening 66 located between the expansion portions 60 and formed in the shaft portion 58 through a flow path shown).

As the expanding machine 56, a water-sealing machine having the trade name "PACKER" manufactured by Toa Grout Kogyo Kabushiki Kaisha, may be used.

The expanding machine 56 is disposed within the base 32 with the expansion portion 60 in a shrunken configuration. Subsequently, the expanding machine 56 is moved to a predetermined position within the first pipeline 12 together with the base 32 and the expansion portions 60 are radially expanded by the pressure fluid supplied from a fluid source installed on the ground to the nipple 62 through a hose, such that the base 32 may not displace against the expanding machine 56.

The base 32 and the expanding machine 56 are disposed relative to each other, so that the center of the hole 42 in the base 32 may be placed between the expansion portions 60 of the expanding machine 56.

For instance, when the first pipeline 12 is of such a size that an operator cannot enter, the base 32 and the expanding machine 56, may be moved to a predetermined position within the first pipeline 12 by passing a rope through the first pipeline 12 from one end to the other end thereof, connecting the rope to the expanding machine 56 at the other end of the first pipeline 12; and moving the rope a predetermined distance toward the one end of the first pipeline 12.

When the expanding machine 56 and the base 32 are moved, it is preferable that a television camera is mounted on the expanding machine 56, and the picture image generated by the television camera is monitored.

As shown in FIG. 8, a recess 68, receiving :the flange portion 24 of the cut-off member 20 and the base 32, is formed on the inner surface of the first pipeline 12. The recess 68 is formed before the first and second elongate members 46 and 48 are respectively inserted into the first and second pipelines 12 and 141.

When the base 32 and the expanding machine 56 are moved to the position where the hole 42 of the base 32 confronts the opening of the flange portion 24 of the cut-off member 20, the pressure fluid is supplied to the nipple 62 of the expanding machine 56, and the expansion portions 60 are further expanded in the radial direction.

Figure 9:
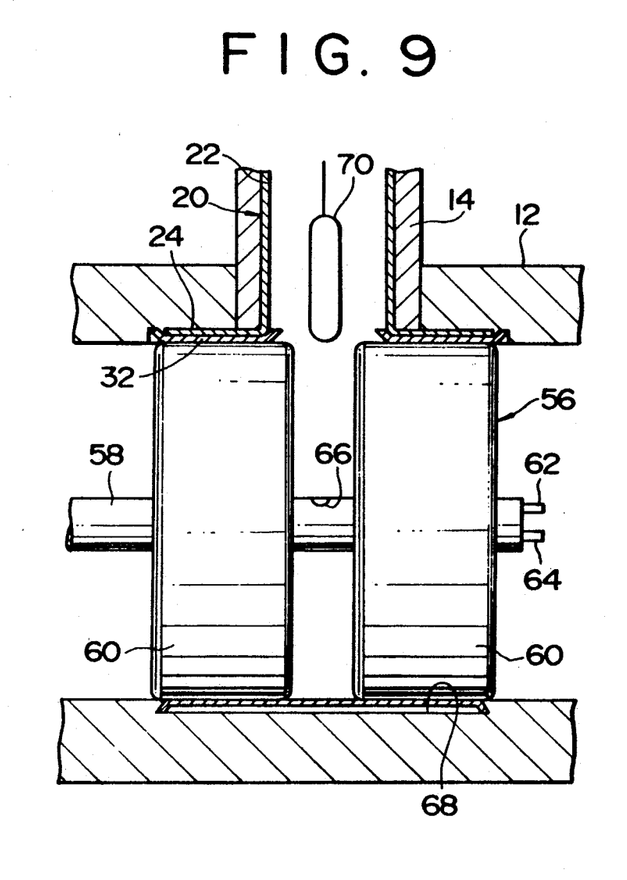
FIG. 9 is a cross-sectional view showing the condition of the base expanded within the pipeline.
Figure 10:
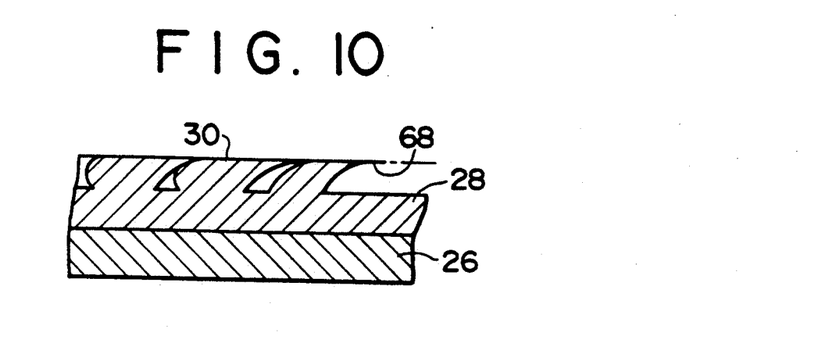
FIG. 10 is a cross-sectional view showing the condition of a deformed projection.

According to this procedure, the base 32 is expanded in the radial direction such that both ends of the sheet portion 34 slightly overlap with each other, i.e., such that the male engaging portion 38 is engageable with either of the female engaging portions 36. As a result, the projections 30 of the cut-off member 20 are pressed by the sheet portion 34 against the inner surface of the first pipeline 12 as shown in FIG. 9, so that the projections 30 are elastically deformed as shown in FIG. 10.

The pressure fluid within the expansion portion 60 is then removed, until the male engaging portion 38 is engaged with either of the female engaging portions 36 by the restoring force of the projections 30. The base 32 is now in a shrunken configuration. As a result, the projections 30 remain pressed against the inner surface of the first pipeline 12 by the base 32. Also, airtightness between the inner surface of the first pipeline 12 and the flange portion 24 and between the flange portion 24 and the base 32 are maintained.

Subsequently, the pressure fluid is supplied to the nipple 64 of the expanding machine 56 when the cut-off member 20 is maintained so as to extend through the second pipeline 14. As a result, the top end of the hose portion 22 is closed in airtightness, and further airtightness between the expansion portion 60 and the base 32 is maintained.

Since the pressure fluid is supplied from the opening 66 of the shaft portion 58 into the cut-off member 20, the cut-off member 20 is expanded in the radial direction so that the hose portion 22 may come into contact with the inner surface of the second pipeline 14.

The cut-off member 20 is hardened by the hardening means when the cut-off member 20 is expanded. This operation is performed by moving the hardening means 70, preliminarily disposed within the cut-off member 20 as shown in FIG. 9, toward the hose portion 22 within the cut-off member 20 at least one time, while generating heat or light, especially ultraviolet light, by feeding electric power to the hardening means 70.

The hardening means 70 may be moved by use of the rope, preliminarily disposed at the cut-off member 20 together with the hardening means 70.

After the pressure fluid within the expansion portion 60 is removed, the expanding machine 56 is removed. The top end of the cut-off member 20 is also opened; the hardening means 70 is removed from the opened top end; and the top end of the cut-off member 20 is fixed to the manhole 18.

Since the base 32 is maintained such that the male engaging portion 38 is engaged with either of the female engaging portions 36 by the restoring force of the projections 30, the flange portion 24 remains pressed against the inner surface of the first pipe 12 by the base 32, and the airtightness between the inner surface of the first pipe 12 and the flange portion 24 and between the flange portion 24 and the base 32 is maintained.

As a result, the leakage of water from the connection portion is prevented, and the leakage of water from a portion of the second pipeline 14 is also prevented.

The cut-off member 20 may be expanded into a predetermined form by supplying the pressure fluid to the hose portion 22 from its top end.

As mentioned above, the cut-off member 20 may be disposed within the first and second pipelines 12 and 14 by drawing back the second elongate member 48 toward the manhole 18 together with the first elongate member 46 when the cut-off member 20 is engaged with the rear end of the first elongate member 46.

Instead of using the first and second elongate members as means for drawing the cut-off member into the first and second pipelines, one elongate member may be used. In this case, the elongate member is passed from the manhole 18 into the other manhole 16 through the second pipeline 14, the portion connecting the pipeline 12 to the pipeline 14 and the first pipeline 12.

When one elongate member is used as the drawing means, the elongate member may be passed from the manhole 18 into the other manhole 16 through both of the pipelines by engaging the top end of the elongate member with a truck disposed in the first pipeline, so as to be movable within the first pipeline, and moving the truck toward one end of the first pipeline in the engaged condition.

Figure 11:
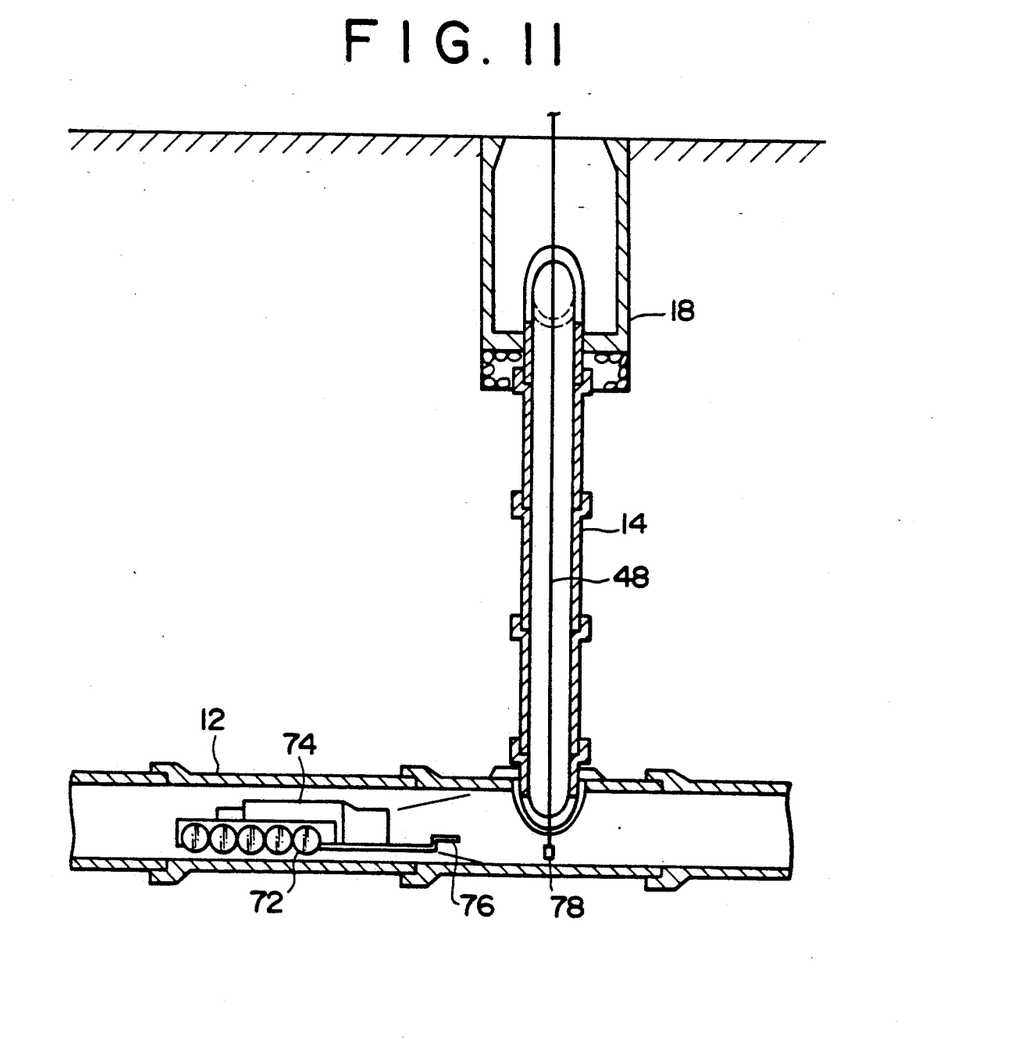
FIG. 11 is a view showing another preferred embodiment, in which an elongate member is passed into the pipeline.
Figure 12:
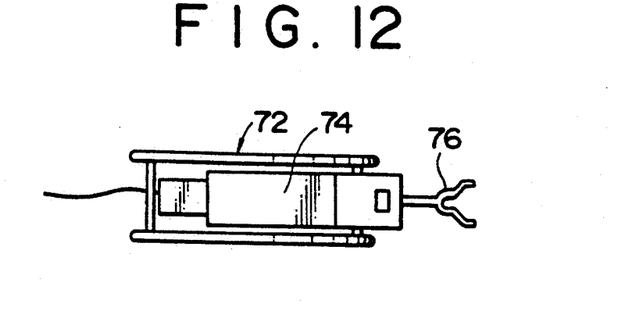
FIG. 12 is a plan view showing a truck of FIG. 11.

A carrier or truck 72 shown in FIGS. 11 and 12 is mounted with a television camera 74 and has a Y-shaped hook 76 projecting forward. The elongate member 48, passed from the manhole 18 to the first pipeline 12 through the second pipeline 14, has a spherical engaging portion 78, which is engaged with a hook 76, at its top end.

The truck 72 travels by itself within the first pipeline 12 toward the manhole 16, shown in FIG. 1, when the engaging portion 78 of the elongate member 48 is engaged with the hook 76. In this way, the elongate member 48 passes into both of the pipelines 12 and 14.

Figure 13:
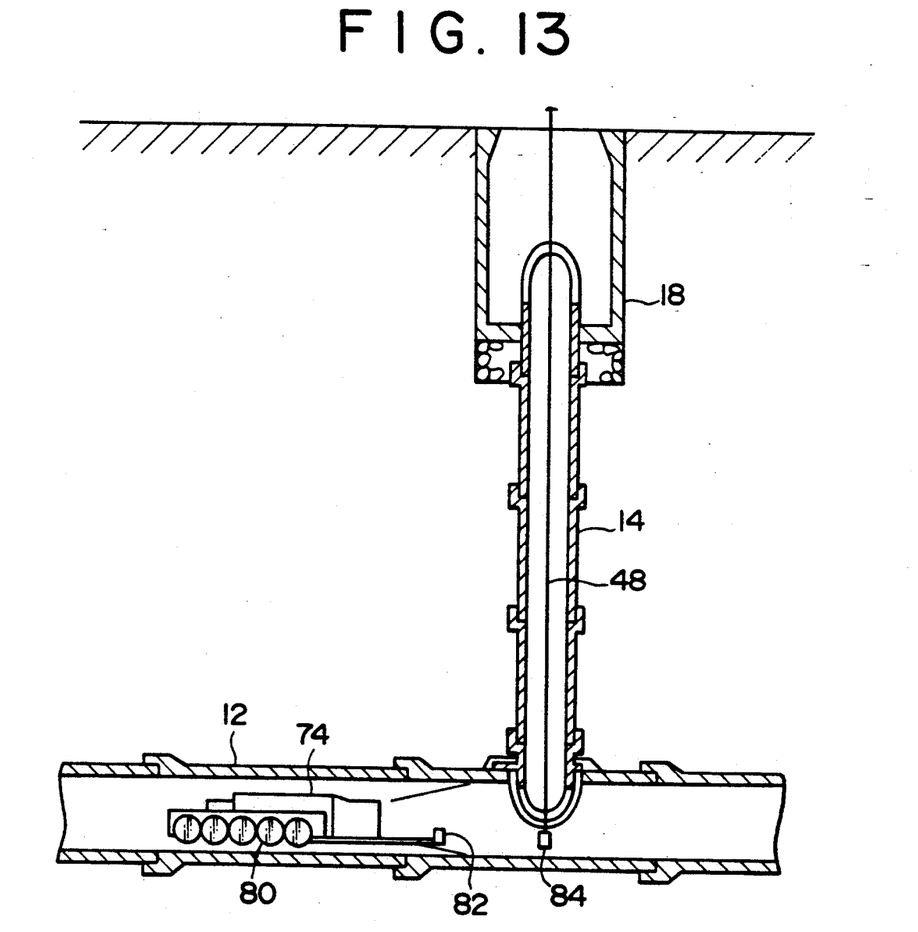
FIG. 13 is a view showing a further preferred embodiment, in which the elongate member is passed into the pipeline.
Figure 14:
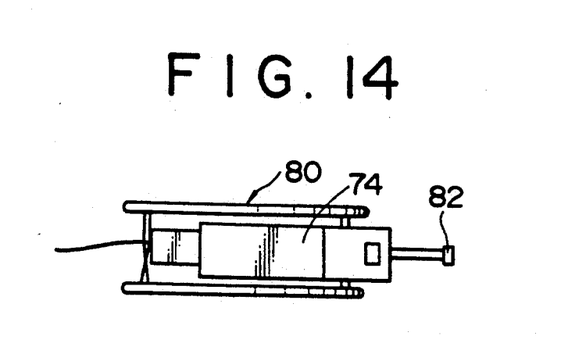
FIG. 14 is a plan view showing a truck of FIG. 13.

A carrier or truck 80 shown in FIGS. 13 and 14 has a permanent magnet 82 instead of the hook 76. The elongate member 48, passed from the manhole 18 to the first pipeline 12 through the second pipeline 14, has a magnetic body 84 at its top end.

The truck 80 travels by itself within the first pipeline 12 toward the manhole 16, shown in FIG. 13, when the magnetic body 84 of the elongate member 48, passed from the manhole 18 to the first pipeline 12 through the second pipeline 14, is magnetically engaged with the permanent magnet by attracting the magnetic body 84 to the permanent magnet. In this way, the elongate member 48 passes into both of the pipelines 12 and 14.

Figure 15:
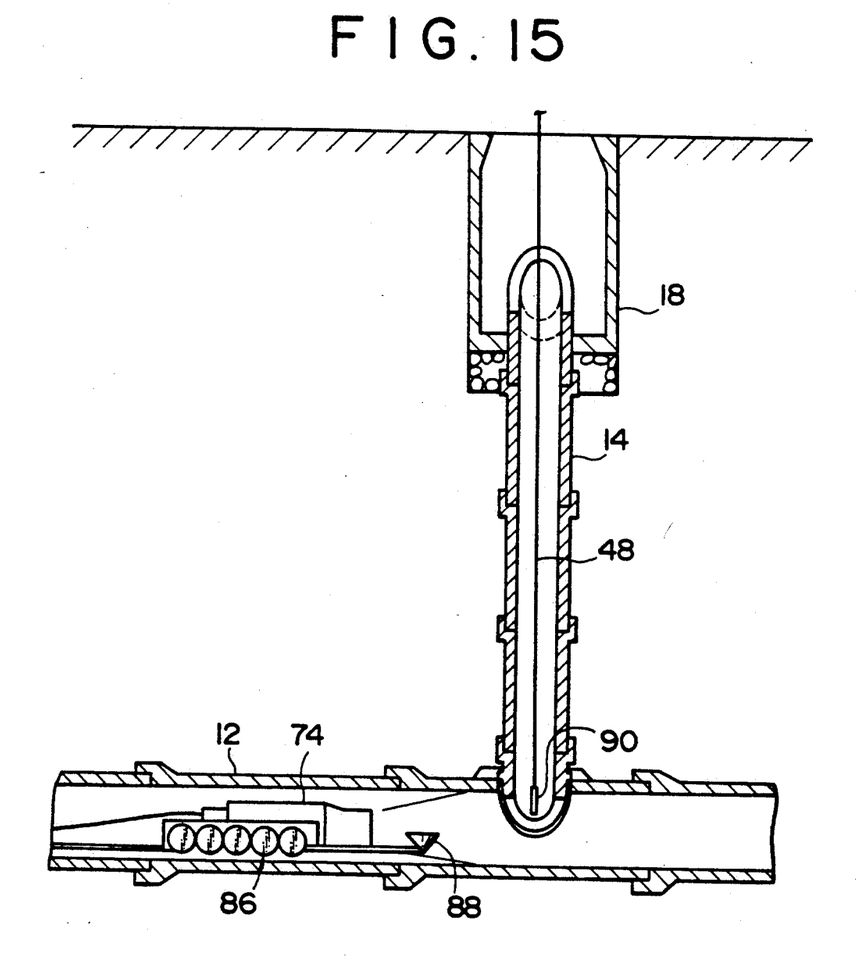
FIG. 15 is a view showing a yet further preferred embodiment, in which the elongate member is passed into the pipeline.
Figure 16:
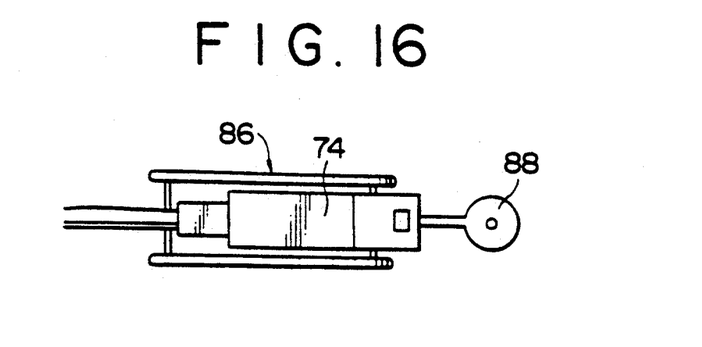
FIG. 16 is a plan view showing a truck of FIG. 15.

A carrier or truck 86 shown in FIGS. 15 and 16 has a vacuum adsorption plate 88 instead of the hook 76. The elongate member 48, passed from the manhole 18 to the first pipeline 12 through the second pipeline 14, has a cloth-like, thin and soft adsorbed member 90 at its top end. The vacuum adsorption plate 88 is connected to a vacuum pump (not shown).

The truck 86 travels by itself within the first pipeline 12 toward the manhole 16, shown in FIG. 1, when the adsorbed member 90 is suctionally engaged with the vacuum adsorption plate 88 by suction acting on the adsorbed member 90 to draw it into contact with the vacuum adsorption plate 88.

Figure 17:
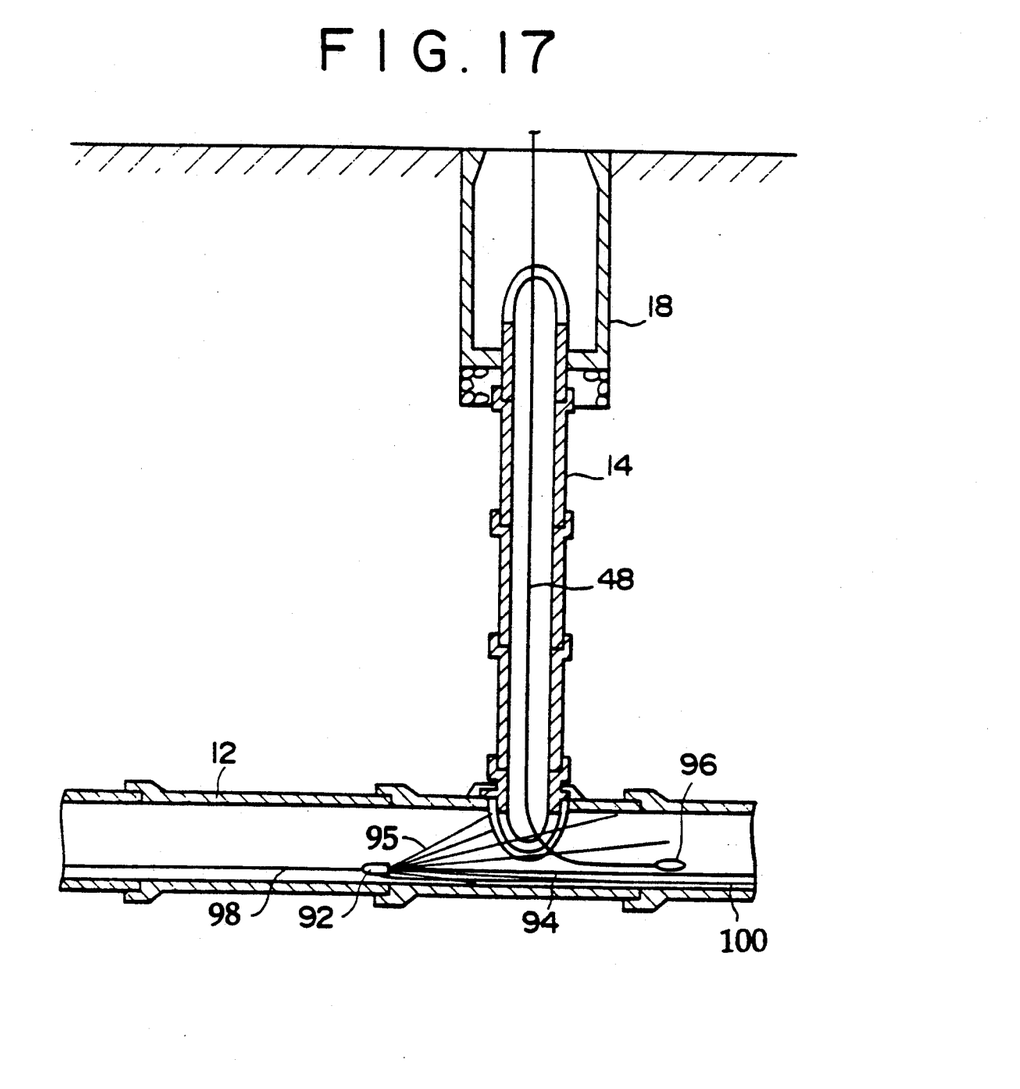
FIG. 17 is a view showing a still further preferred embodiment, in which the elongate member is passed into the pipeline.

In addition to the above-mentioned embodiments, for example, as shown in FIG. 17, the elongate member 48 may be propelled toward the manhole 16, shown in FIG. 1, by high-pressure water 95 jetted from a nozzle 92 disposed in the first pipeline 12.

The nozzle 92 is connected to a high-pressure supply source (not shown) through a hose 94. Further, the nozzle 92 is moved within the first pipeline 12 by means of ropes 98 and 100 or the like when propelling the elongate member 48. The elongate member 48 has a cloth-like, thin and soft member 96 for receiving the high-pressure water 95 at its top end.

The present invention is suitable for performing the water cut-off method for pipeline sized such that an operator is unable to enter, while it is also applied to pipelines that an operator is able to enter. The present invention is also applied to cut-off water from the portion connecting pipelines other than sewerage pipelines. For example, the present invention is applicable to the portion connecting the main pipe in a pipeline for a power line or a telephone line, i.e., the first pipeline to its branch pipe, i.e., the second pipeline.

What is claimed is:

1. A method of water leakage prevention in a portion connecting a first pipeline, having one end and an other end as well as an inner surface and an outer surface, to a second pipeline, having one end in communication with said first pipeline and an other end as well as an inner surface, an outer surface, and an inner diameter, comprising the steps of:

passing an elastically deformable elongate member from the other end of the second pipeline to the one end of the first pipeline;

engaging an impermeable cut-off member, having an expandable hose portion and a flange portion integrally provided at one end of the hose portion, with said elongate member at the one end of said first pipeline at said hose portion, said hose portion having a length longer than that of said second pipeline;

drawing said cut-off member into said first and second pipelines by drawing back said elongate member toward said other end of said second pipeline to dispose said cut-off member in said first and second pipelines, so that the flange portion may be positioned within said first pipeline and the hose portion may extend within said second pipeline;

maintaining said flange portion in liquid-tight contact with said inner surface of said first pipeline;

disposing an elastically deformable sheet-like base wound in a cylindrical form to be radially expandable within said first pipeline such that a hole in said base confronts the opening of the flange portion of the cut-off member, said hole having a diameter approximately equal to the inner diameter of said second pipeline;

pressing said flange portion on said inner surface of said first pipeline by means of said base by radially expanding said base, and maintaining said base in a radially expanded state by mutually engaging a plurality of engaging portions provided at said base; and maintaining said hose portion so that said hose portion may be in contact with said inner surface of said second pipeline in order to cover said inner surface of said second pipeline over the entire length of said second pipeline from the inside with said hose portion.

2. A method according to claim 1, further comprising the step of forming in the inner surface of said first pipeline a recess for disposing at least said flange portion and said base, prior to disposing said cut-off member.

3. A method according to claim 2, wherein said recess has a width and a bottom surface and said base has a width smaller than that of said recess, and wherein said flange portion is maintained in liquid-tight contact with the bottom surface of said recess by the step of maintaining said base in the radially expanded state.

4. A method according to claim 3, wherein said flange portion has a diameter smaller than the width of said recess.

* * * * *

UNITED STATES PATENT AND TRADEMARK OFFICE
CERTIFICATE OF CORRECTION

PATENT NO. : 5,297,582
DATED : March 29, 1994
INVENTOR(S) : Hisashi Kitajima and Hidehiro Noda It is certified that error appears in the above-indentified patent and that said Letters Patent is hereby corrected as shown below:

Column 2, line 65, change "cut-of f" to --cut-off--;
Column 5, line 30, change "33" to --32--;
Column 5, line 63, after "the" delete ",";
Column 7, line 42, change "141" to --14--.

Signed and Sealed this

Twentieth Day of December, 1994

Attest:

BRUCE LEHMAN

Attesting Officer  Commissioner of Patents and Trademarks